(12) United States Patent
Piede et al.

(10) Patent No.: US 7,587,106 B2
(45) Date of Patent: Sep. 8, 2009

(54) OPTICAL CROSSOVER IN THIN SILICON

(75) Inventors: David Piede, Allentown, PA (US);
Prakash Gothoskar, Allentown, PA (US); Margaret Ghiron, Allentown, PA (US); Robert Keith Montgomery, Easton, PA (US); Vipulkumar Patel, Breinigsville, PA (US); Soham Pathak, Allentown, PA (US); Kalpendu Shastri, Orefield, PA (US); Katherine A. Yanushefski, Zionsville, PA (US)

(73) Assignee: Lightwire, Inc., Allentown, PA (US)

( * ) Notice: Subject to any disclaimer, the term of this patent is extended or adjusted under 35 U.S.C. 154(b) by 0 days.

(21) Appl. No.: 12/157,630

(22) Filed: Jun. 12, 2008

(65) Prior Publication Data

US 2008/0253713 A1 Oct. 16, 2008

Related U.S. Application Data

(62) Division of application No. 11/089,478, filed on Mar. 24, 2005, now abandoned.

(60) Provisional application No. 60/555,993, filed on Mar. 24, 2004.

(51) Int. Cl.
*G02B 6/12* (2006.01)
(52) U.S. Cl. .................................................. 385/14
(58) Field of Classification Search .................... 385/14
See application file for complete search history.

(56) References Cited

U.S. PATENT DOCUMENTS

| 4,961,619 | A | | 10/1990 | Hernandez-Gil et al. |
| 5,157,756 | A | | 10/1992 | Nishimoto |
| 5,978,524 | A | * | 11/1999 | Bischel et al. ................. 385/4 |
| 6,108,478 | A | * | 8/2000 | Harpin et al. ............... 385/129 |
| 6,198,860 | B1 | * | 3/2001 | Johnson et al. ............... 385/28 |
| 6,775,043 | B1 | | 8/2004 | Leung et al. |
| 6,810,165 | B2 | | 10/2004 | Golub et al. |
| 2004/0028336 | A1 | | 2/2004 | Feuer et al. |
| 2004/0179771 | A1 | | 9/2004 | Verhagen et al. |
| 2004/0258361 | A1 | | 12/2004 | Telkamp et al. |
| 2005/0041912 | A1 | * | 2/2005 | deBlanc et al. ............... 385/17 |
| 2006/0133716 | A1 | * | 6/2006 | Little .......................... 385/14 |

* cited by examiner

*Primary Examiner*—Uyen Chau N Le
*Assistant Examiner*—Hoang Tran
(74) *Attorney, Agent, or Firm*—Wendy W. Koba (57) ABSTRACT

An arrangement for providing optical crossovers between waveguides formed in an SOI-based structure utilize a patterned geometry in the SOI structure that is selected to reduce the effects of crosstalk in the area where the signals overlap. Preferably, the optical signals are fixed to propagate along orthogonal directions (or are of different wavelengths) to minimize the effects of crosstalk. The geometry of the SOI structure is patterned to include predetermined tapers and/or reflecting surfaces to direct/shape the propagating optical signals. The patterned waveguide regions within the optical crossover region may be formed to include overlying polysilicon segments to further shape the propagating beams and improve the coupling efficiency of the crossover arrangement.

10 Claims, 11 Drawing Sheets

OPTICAL CROSSOVER IN THIN SILICON

CROSS-REFERENCE TO RELATED APPLICATION

The present application is a divisional of U.S. application Ser. No. 11/089,478, filed Mar. 24, 2005, now abandoned which claims the benefit of U.S. Provisional Application No. 60/555,993, filed Mar. 24, 2004.

TECHNICAL FIELD

The present invention is directed to optical crossovers and, more particularly, to the formation of optical crossovers in integrated photonic circuits utilizing a thin silicon waveguiding layer.

BACKGROUND OF THE INVENTION

In the design and implementation of many integrated photonic circuits, waveguide intersections (hereinafter "crossovers") are unavoidable. This is particularly true of designs that involve switch interconnect patterns. However, the intersecting waveguides present an asymmetric index profile at the crossing. This profile disturbs the guided optical mode and excites higher-order optical modes. Since the intersection region is abrupt (i.e., non-adiabatic), it will excite non-guided modes, resulting in crosstalk and loss of optical power within the intersection. Moreover, the losses associated with intersecting planar optical waveguides are of special concern since the loss will be a function of the number of intersections encountered in a particular path, and will therefore vary with path layout.

Many techniques have been proposed for reducing losses at the waveguide crossing. One approach is disclosed in U.S. Pat. No. 4,961,619, issued to Hernandez-Gil et al. on Oct. 9, 1990. In this arrangement, the width of the waveguide is increased or decreased at the crossing junction to modify the optical mode characteristics in that region. This introduces an axial variation in the transverse index of refraction distribution, which allows for better alignment of the electrical fields at the crossing. The Hernandez-Gil et al. arrangement is not very suitable, however, for arrangements where there is a significant difference in refractive index between the guiding material and cladding material, since it requires large tapering regions to adiabatically expand/contract the guided optical mode.

In another prior art reference, U.S. Pat. No. 5,157,756 issued to Nishimoto on Oct. 20, 1972, a peripheral region of low index material is used to surround an island of waveguide material at the center of the crossing/intersecting region. This technique is also of limited use in situations where the refractive index difference is substantial. Thus, a need remains in the prior art for a configuration to provide for optical crossovers in a silicon-based material system where the difference in refractive index between the core and cladding areas may be significant.

SUMMARY OF THE INVENTION

The present invention is directed to optical crossovers and, more particularly, to the formation of optical crossovers in integrated photonic circuits utilizing a thin silicon waveguiding layer. The implementation of the present invention is particularly well-suited for use in an SOI-based integrated photonic structure, where optical waveguiding areas are formed (at least in part) in a relatively thin (preferably, sub-micron) silicon surface layer (referred to as an "SOI layer") supported by an underlying insulating layer on a silicon substrate.

In accordance with the present invention, the waveguiding structure within the SOI-based device is particularly shaped in the crossover region to substantially reduce the possibility of crosstalk, while also coupling a significant portion of the propagating signal between an input waveguide portion and its associated output waveguide portion, thus improving the optical throughput along the separate waveguides.

In one embodiment of the present invention, polysilicon regions of predetermined shapes are disposed over selected areas of the waveguides in the crossover region to further minimize signal loss due to crosstalk by reducing the overlap area of the intersecting signals.

The crossover region may comprise a "pinwheel" geometry for reducing the area within which the overlapping signals will intersect. The pinwheel itself may comprise various geometries to accommodate different signal conditions, such as transforming an expanding beam into a collimated beam, a collimated beam into a focused beam, etc.

It is an advantage of the present invention that well-known CMOS processing techniques may be used to pattern and form the desired geometry of the crossover region, simplifying the manufacturing process. Similarly, the ability to deposit and pattern polysilicon in a desired manner is well-known from CMOS processing technology.

Other and further embodiments and advantages of the present invention will become apparent during the course of the following discussion and by reference to the accompanying drawings.

BRIEF DESCRIPTION OF THE DRAWINGS

Referring now to the drawings.

DETAILED DESCRIPTION

As briefly mentioned above, relatively thin silicon surface layers ("SOI layers") are used in SOI-based opto-electronic arrangements to support the propagation of high speed optical signals. As is known in the art, it is possible to perform purely optical and opto-electronic functions within the same SOI structure, using the same CMOS fabrication techniques to form both types of devices. The use of CMOS techniques allows for the size of the optical functions to be greatly reduced (on the order of, for example, an area reduction on the order of 100× to 10,000×) as enabled by the use of high index contrast silicon waveguides. Additionally, when implemented properly, the manipulation of light using the free carrier effect requires no DC power. These advantages enable the optics to approach the same functional block sizes as traditional electronics. Thus, it is possible to have hundreds, if not thousands, of optical/opto-electronic functions on the same integrated circuit die, requiring a similar number of connections to be formed between associated devices. However, until the development of the present invention, as discussed in detail hereinbelow, there has remained a need to form a "multi-level" optical interconnection for this type of optical arrangement, similar to the multi-level metal interconnect structures well-known in today's integrated electronic circuit design, that addresses the various issues associated with the cross over of intersecting optical signals.

Figure 1A:
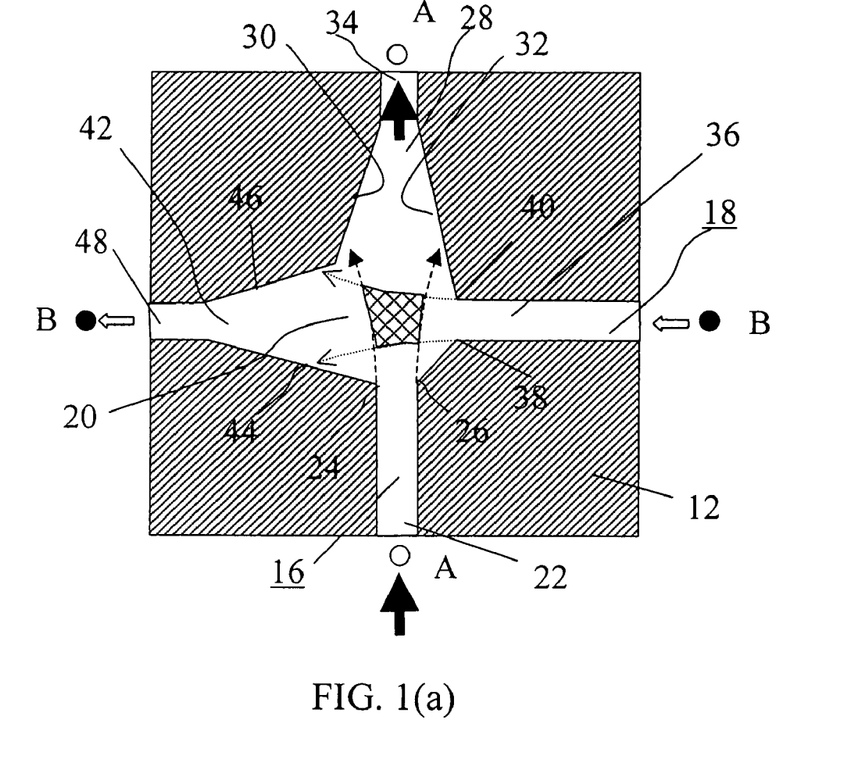
FIGS. 1(a) and (b) illustrate a first exemplary embodiment of an optical crossover in an SOI-based structure, formed in accordance with the present invention, with FIG. 1(a) containing a top view and FIG. 1(b) containing an isometric view.
Figure 1B:
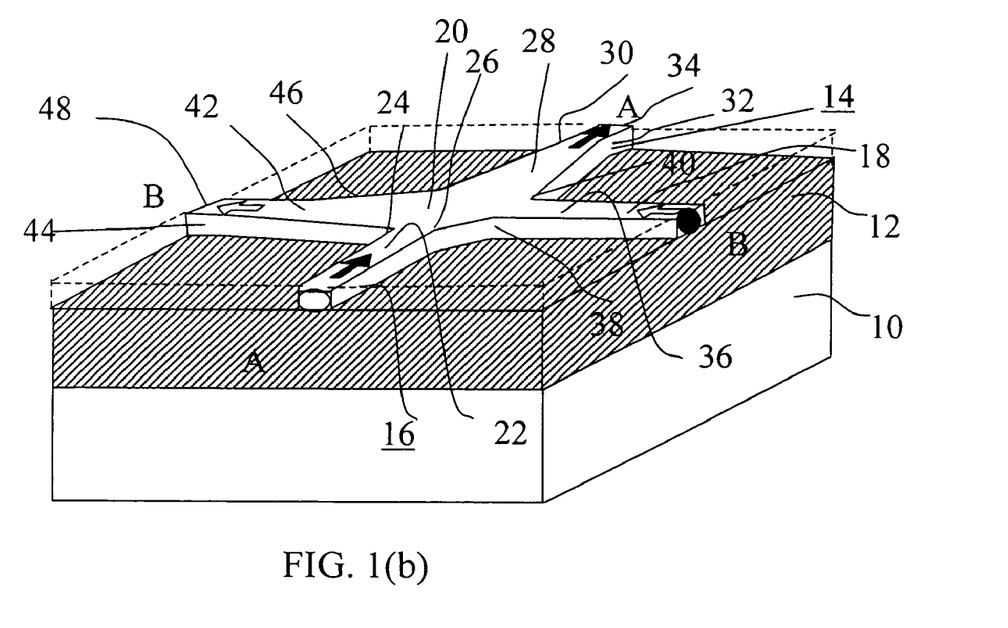

FIG. 1 illustrates a first embodiment of an SOI-based optical crossover structure formed in accordance with the present invention, where FIG. 1(a) contains a top view and FIG. 1(b) an isometric view of the same structure. As with all of the various embodiments that will be discussed hereinbelow, each SOI-based optical crossover structure of the present invention comprises a silicon substrate 10 and an insulating (dielectric) layer 12 disposed over silicon substrate 10. A relatively thin (preferably, sub-micron in thickness) single crystal silicon surface layer 14 is formed over insulating layer 12, where silicon surface layer 14 is nominally referred to as an "SOI layer". As shown in FIGS. 1(a) and (b), SOI layer 14 has been processed (i.e., patterned and etched) to form a pair of optical waveguides 16, 18 that intersect each other within a crossover region 20 (the intersection indicated by the shaded area within region 20). In accordance with the present invention, crossover region 20 is particularly patterned and formed to allow for two propagating optical beams to cross through each other with relatively high efficiency and relatively low crosstalk. The patterned area where SOI layer 14 has been removed can be replaced (as shown by the dotted line in FIG. 1(b)) with a CMOS-compatible material with a lower index of refraction, such as silicon dioxide or silicon nitride to re-planarize the structure and simplify further processing.

In order to minimize the effects of optical crossover, the light beams propagating through waveguides 16 and 18 should be substantially orthogonal to each other (if both of the same operating wavelength), or exhibit different operating wavelengths. For the purposes of the present discussion, the signal propagating along first waveguide 16 will be referred to as optical signal A and the signal propagating along second waveguide 18 will be referred to as optical signal B (where signals A and B will either be orthogonal or at different operating wavelengths).

As shown in FIG. 1(a), first waveguide 16 includes an input waveguiding section 22 that terminates at crossover region 20, as defined by corners 24 and 26. The termination of input waveguiding section 22 allows for propagating optical signal A to expand as it traverses crossover region 20, as indicated by the dashed arrows in FIG. 1(a). In particular, the shape of the termination of input waveguiding section 22 determines the beam characteristics as it enters crossover region 20. In accordance with the present invention, output waveguiding section 28 of first waveguide 16 includes inwardly tapering (hereinafter defined as "beam-capturing") sidewalls 30, 32 that function to capture expanding, propagating optical signal A and re-focus the beam into exit port 34. Exit port 34 is preferably laterally confined to a dimension typically less than one micron, allowing for the arrangement of the present invention to be particularly well-suited for use in single mode applications.

In a similar manner, second optical waveguide 18 is formed to include an input waveguiding section 36 that terminates at corners 38, 40 to allow propagating optical signal B to expand as it traverses crossover region 20 (as shown by the dotted arrows in FIG. 1(a)). Output waveguide section 42 of second optical waveguide 18 includes beam-capturing sidewalls 44, 46 to re-focus the expanding optical signal B into an exit port 48 (exit port 48 being preferably of sub-micron lateral dimension to support only single mode propagation).

In accordance with the present invention, proper patterning of crossover region 20 to include corners at the ends of the input waveguiding sections and the beam-capturing sidewalls along the output waveguiding sections allows for optical signals A and B to intersect within region 20 without experiencing significant crosstalk and signal loss by confining the intersecting area to a relatively small shaded region, as shown. As importantly, it is to be understood that signals A and B are preferably orthogonal or operating at different wavelengths to provide additional isolation between the propagating signals.

Figure 2:
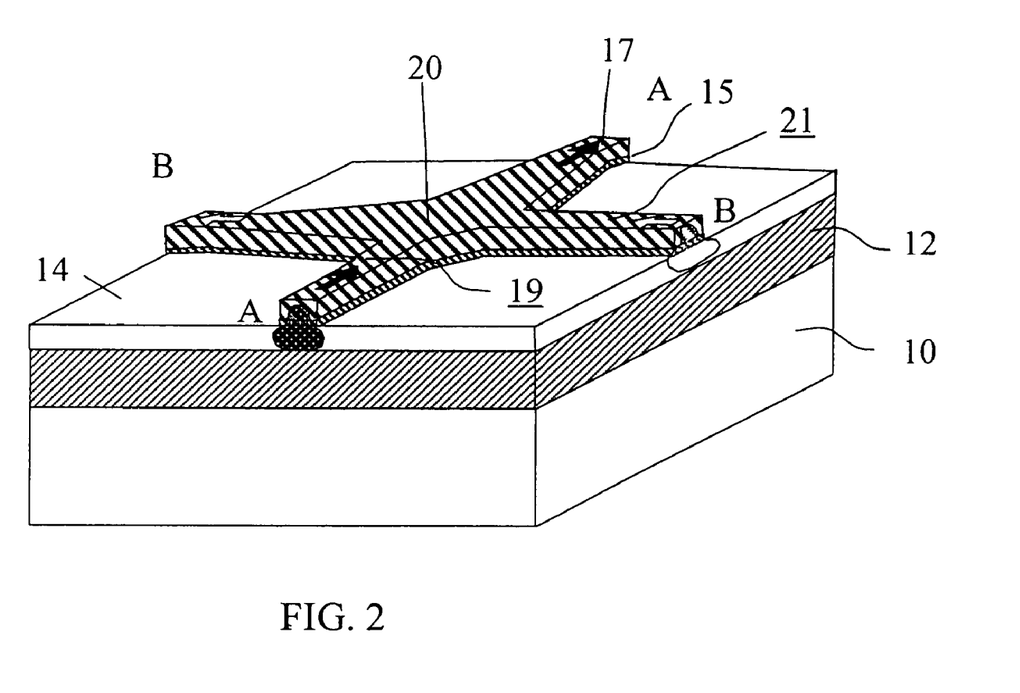
FIG. 2 contains an isometric view of an alternative embodiment of the arrangement of FIG. 1, with the optical waveguides and crossover region formed in a layer of polysilicon deposited over the SOI structure.

FIG. 2 contains an isometric view of an alternative embodiment of the arrangement of FIG. 1, where instead of forming the intersecting waveguides within SOI layer 14, the intersecting waveguides are formed within a layer of polysilicon 17 that has been disposed over SOI layer 14 and subsequently patterned to form the desired waveguiding structure. The addition of the polysilicon layer 17 serves to modify the optical mode field, as shown. As in the case in the formation of such SOI-based devices, a relatively thin oxide layer 15 is disposed between SOI layer 14 and polysilicon layer 17, where oxide layer 15 is etched in the same manner as polysilicon layer 17 to form the crossover structure. In this particular embodiment, an essentially identical arrangement as discussed above is formed, including a first waveguide 19 to support the propagation of optical signal A and a second waveguide 21 to support the propagation of optical signal B, with a crossover region 20 as discussed hereinabove.

Figure 3A:
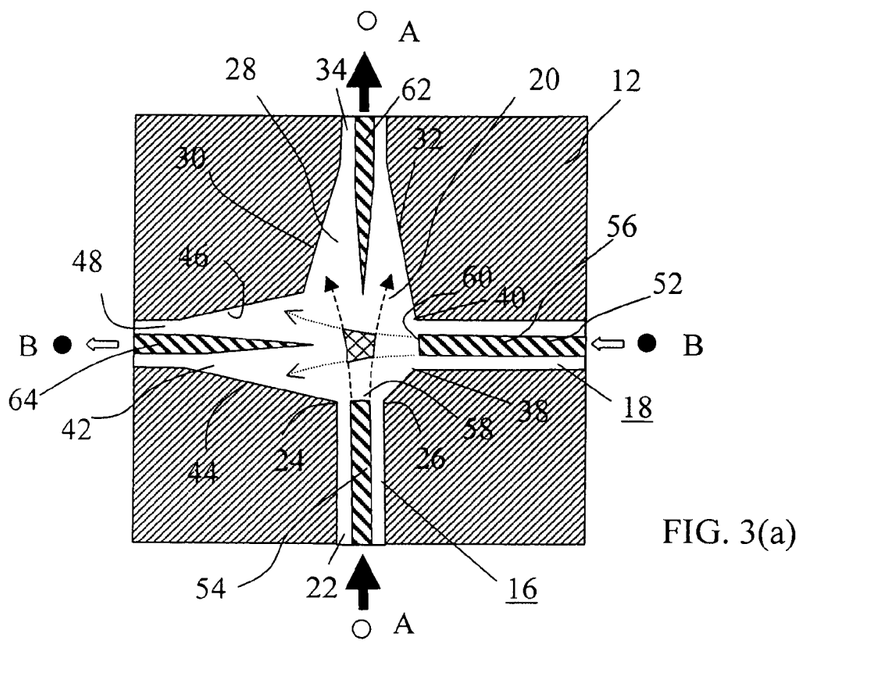
FIGS. 3(a) and (b) illustrate a variation of the embodiment of FIG. 1, with polysilicon segments disposed over input and output waveguiding regions, FIG. 3(a) being a top view and FIG. 3(b) being an isometric view.
Figure 3B:
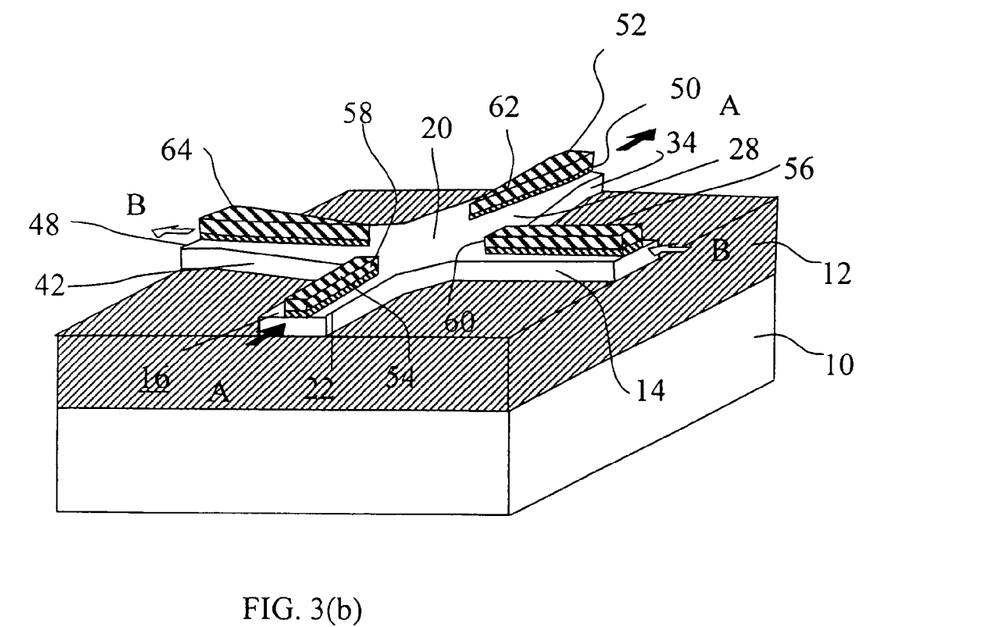

FIG. 3 illustrates another variation of the embodiment of FIG. 1, where strategically-located polysilicon segments have been added to further shape and control the paths of the propagating optical signals, where as in FIG. 1 the waveguides are formed within SOI layer 14. In particular, FIG. 3(a) contains a top view of this exemplary "poly-loaded" variation and FIG. 3(b) contains an isometric view of the same arrangement. During the fabrication process for this variation, a relatively thin oxide layer 50 is first formed over SOI layer 14, and a polysilicon layer 52 is formed over oxide layer 50. The combination of layers 50, 52 is then patterned and etched to form the discrete shaping areas as shown in FIG. 3. In particular, polysilicon layer 52 is patterned to form a pair of input launching segments 54, 56, where these segments include terminating end portions 58 and 60, respectively. To further reduce the optical loss, polysilicon layer 52 can be further processed to enhance the crystallinity of its structure, so that it becomes similar in morphology to SOI layer 14. The particular geometry of input segments 54, 56 assists in confining the propagating optical signals A and B to the interior portions of waveguides 16 and 18, thus reducing scattering losses and minimizing the area of signal overlap within crossover region 20 (compare, for example, the shaded area in crossover region 20 of FIG. 1(a) to the shaded area in FIG. 3(a)). Referring to FIGS. 3(a) and (b), a pair of output tapered segments 62 and 64 are shown as formed in polysilicon layer 52 so as to overly output waveguiding sections 28 and 42, respectively. The tapered geometry of polysilicon segments 62 and 64 is used to reduce reflections and improve the coupling efficiency of the propagating signals into exit ports 34 and 48, respectively. It is to be noted that the terminations 58, 60 of input launching segments 54, 56 may also be tapered to reduce reflections.

Figure 4:
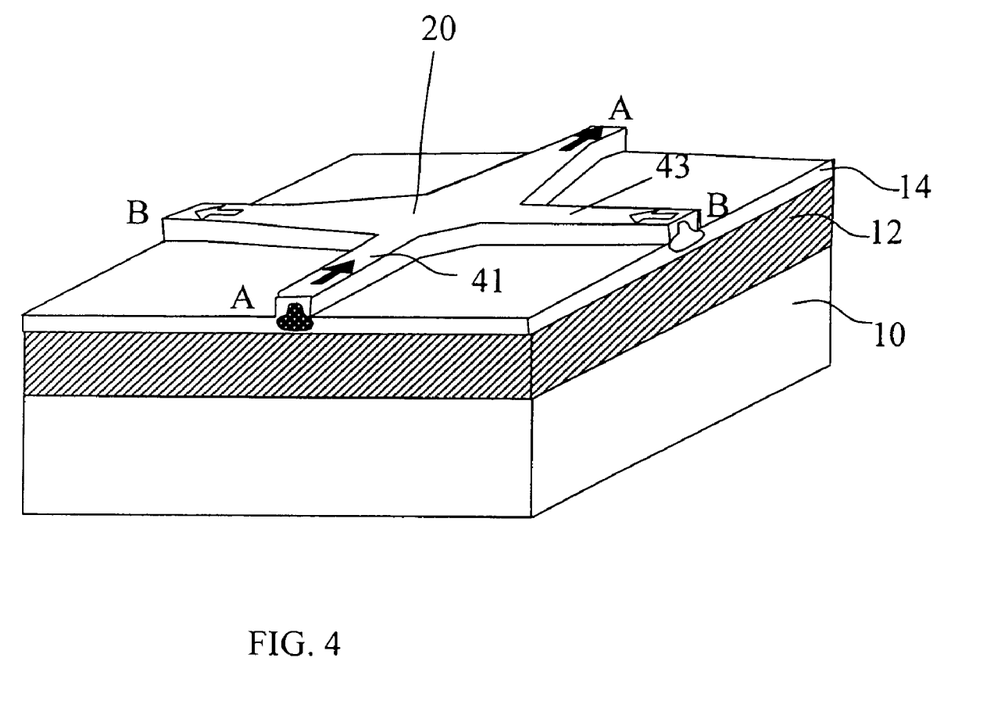
FIG. 4 illustrates an alternative embodiment of the present invention, formed with rib structured optical waveguides in the SOI layer of an SOI structure.

As an alternative to the strip waveguide structures discussed above, a "rib" waveguiding structure may be formed in SOI layer 14 to include a pair of intersecting waveguides with a crossover area in accordance with the present invention. FIG. 4 contains an isometric view of this exemplary embodiment, where SOI layer 14 has been partially etched to remove a portion of layer 14 outside of the waveguiding region, the remainder of SOI layer 14 being intact so that underlying dielectric layer 12 remains completely covered. As shown, a patterning and controlled etching of SOI layer 14 allows the formation of a first waveguide 41 and a second waveguide 43 intersecting as before in crossover region 20.

Figure 5A:
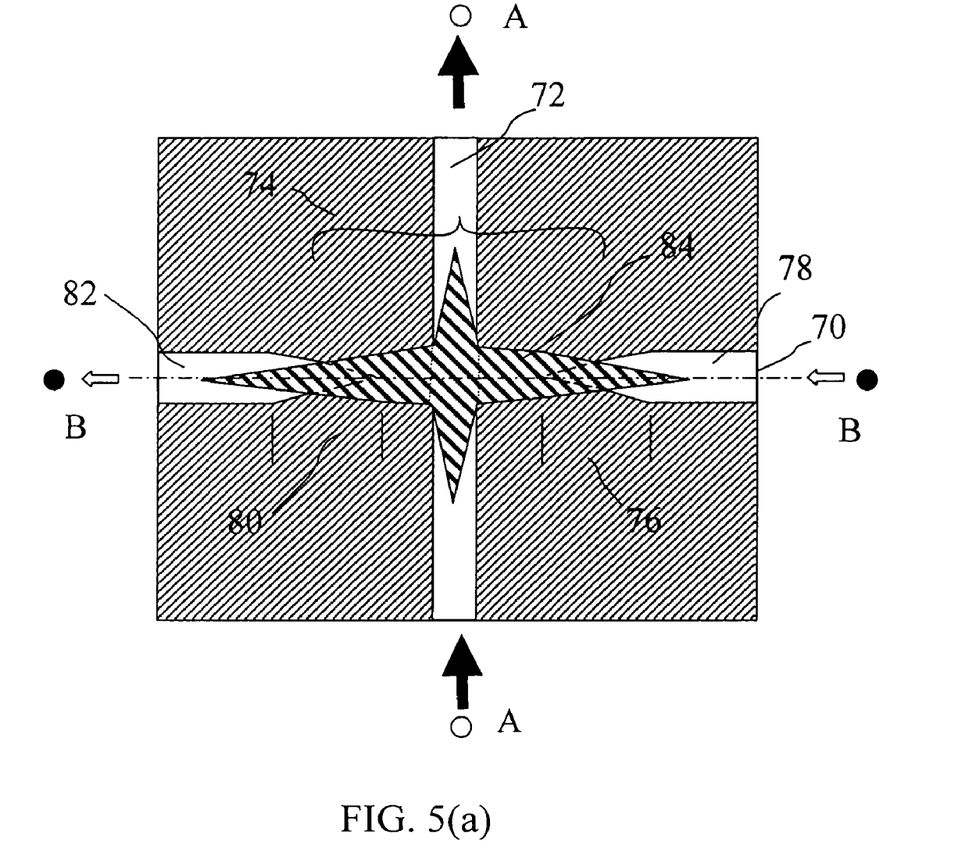
FIGS. 5(a) and (b) illustrate, in a top view and isometric view, an alternative embodiment of the present invention utilizing a polysilicon bridging segment in the optical crossover region.
Figure 5B:
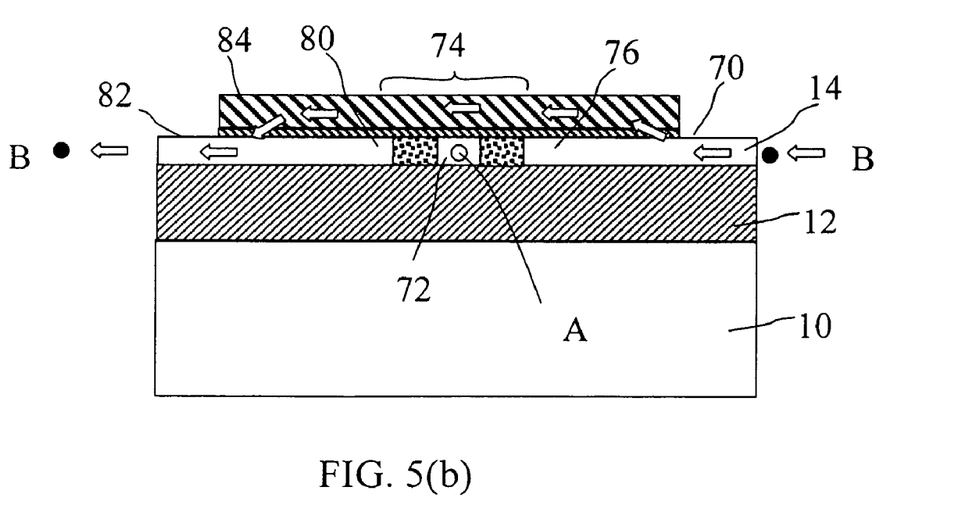

FIGS. 5(a) and (b) illustrate another embodiment of the present invention, in a top view and cut-away side view, respectively. In this embodiment, a pair of waveguides 70 and 72 is used to support the propagation of optical signals A and B within the SOI-based structure of silicon substrate 10, insulating layer 12 and SOI layer 14. In this particular embodiment, a crossover region 74 is defined by forming a first inward tapered region 76 along a first waveguiding section 78 of first optical waveguide 70 and a second outward tapered region 80 along a second waveguiding section 82 of first optical waveguide 70. Crossover region 74 is further defined by the use of a polysilicon bridging portion 84 that is appropriately configured, as shown specifically in FIG. 5(a), to facilitate the physical separation of optical signals A and B to minimize crosstalk in accordance with the present invention. As best shown in FIG. 5(b), the inclusion of polysilicon bridging portion 84 functions to migrate propagating optical signal B out of inward tapered region of 76, through bridging portion 84, and then into outward tapered region 80. Advantageously, in crossover region 74 propagating optical signal B is moved out of the signal path of propagating optical signal A, as clearly shown in FIG. 5(b). Thus, the potential for optical crosstalk and signal loss between optical signals A and B is significantly reduced.

As mentioned above, polysilicon bridging portion 84 is formed to include tapering terminations along first waveguide 70 and second waveguide 72 in order to reduce reflections and more efficiently couple the propagating optical signals into their respective output waveguiding sections 72 and 82.

An efficient crossover region structure has been developed and is illustrated in the various embodiments shown in FIGS. 6-11. In general, this crossover region is defined as a "pinwheel" geometry, including sidewalls providing total internal reflection (TIR) to direct propagating optical signals A and B between their input and output waveguiding sections. In a first embodiment as shown in a top view of FIG. 6, a crossover pinwheel region 90 is used to couple optical signal A between an input waveguiding region 92 and an output waveguiding region 94. In similar fashion, crossover pinwheel region 90 is used to couple optical signal B between an input waveguiding region 96 and an output waveguiding region 98.

Figure 6:
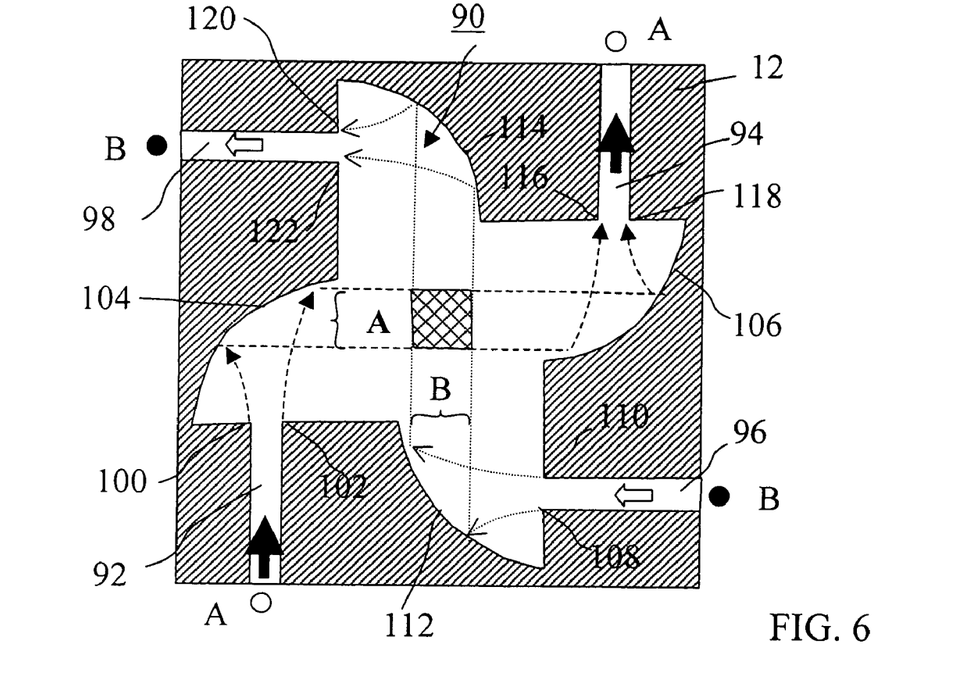
FIG. 6 is a top view of a first exemplary arrangement including a "pinwheel" geometry in the optical crossover region.

In accordance with the present invention, crossover pinwheel region 90 is formed by appropriately patterning and etching SOI layer 14 so as to form a set of reflecting sidewall surfaces to redirect the propagating signals and reduce the area within crossover pinwheel region 90 where the propagating signals will overlap (indicated by the shaded area within region 90). By etching SOI layer 14 to form such surfaces, the difference in refractive index between SOI layer 14 and the adjacent material (for example, "air", or an insulating material, such as silicon dioxide or silicon nitride), the propagating signal will experience TIR and be re-directed to remain within crossover pinwheel region 90. Referring to FIG. 6, incoming optical A is first coupled into input waveguiding region 92. As with the embodiment discussed above in association with FIG. 1, optical signal A will begin to expand upon encountering a pair of corners 100 and 102 at the termination of input waveguiding region 92. The expanding signal then impinges a first curved sidewall surface 104 formed by patterning and etching SOI layer 14, as discussed above. Expanding optical signal A will then reflect off of first curved surface 104 and propagate in a collimated fashion, as shown, within crossover pinwheel region 90 until encountering a second curved sidewall surface 106 also formed within SOI layer 14. As shown by the dashed arrows in FIG. 6, second curved sidewall surface 106 will function to focus propagating signal A into output waveguiding region 94.

Similarly, incoming optical signal B is shown as coupled into input waveguiding section 96 and thereafter expanding as it encounters corners 108 and 110 at the termination of input waveguiding section 96. Expanding optical signal B will then impinge a third curved sidewall surface 112, which will collimate and re-direct signal B (as shown by the dotted lines) through crossover pinwheel region 90. Collimated propagating signal B then impinges a fourth curved sidewall surface 114, which functions to focus propagating optical signal B into output waveguiding section 98, as shown in FIG. 6. A significant aspect of the embodiment of FIG. 6 is that it can be used as a bi-directional device (i.e., using the "outputs" as "inputs" and vice versa).

Figure 7:
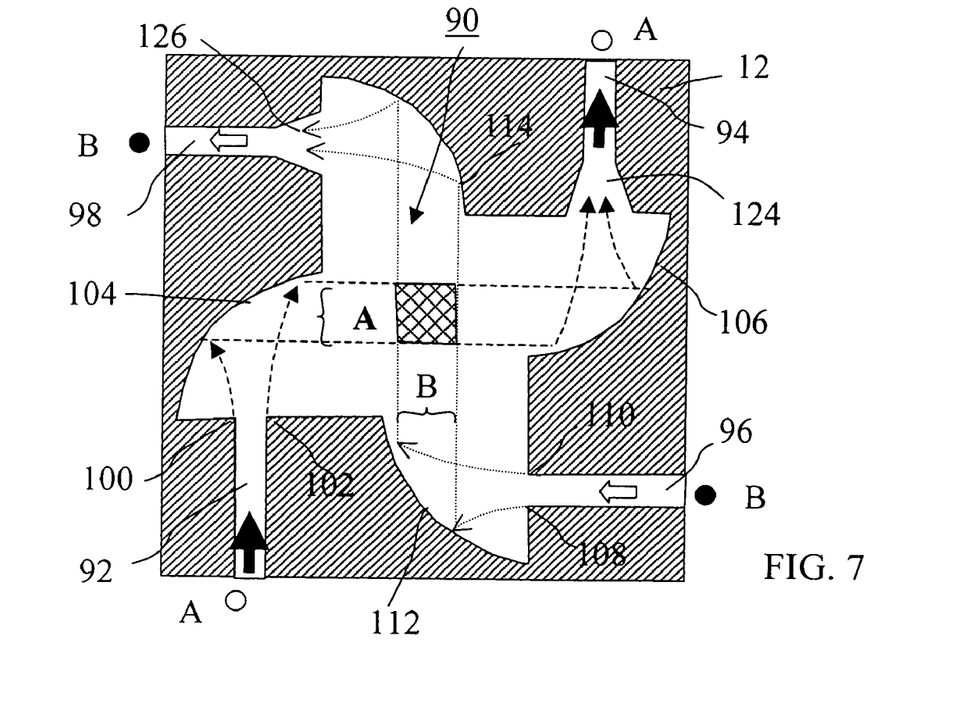
FIG. 7 illustrates a variation of the embodiment of FIG. 6 including beam-capturing output waveguiding regions.

However, coupling into output waveguiding sections 94 and 98 may encounter reflection and backscattering problems associated with the presence of "corners" at the input to these sections. That is, corners 116, 118 of first output waveguiding section 94 and corners 120, 122 of second output waveguiding section 98 may affect the coupling efficiency between crossover pinwheel region 90 and output waveguiding sections 94, 98. FIG. 7 illustrates a variation of the embodiment of FIG. 6 that addresses this concern regarding coupling into the output waveguiding sections. Here, each output waveguiding region is formed to include a beam-capturing tapered portion to improve its coupling efficiency. As shown, first output waveguiding section 94 is formed to include a beam-capturing portion 124 and second output waveguiding section 98 is formed to include a beam-capturing portion 126. The use of the tapered, beam-capturing portions allows for a greater amount of the propagating signal to be collected and directed into its associated output waveguiding section. The use of conventional CMOS processing to form the various waveguiding features of the present invention allows for beam-capturing portions 124, 126 to easily be included by adjusting the patterning of crossover pinwheel region 90. While improving the coupling efficiency into the output waveguiding sections, it is to be understood that the inclusion of the tapered geometry results in eliminating the possibility of using the structure as a bi-directional device. Therefore, if the need exists to employ bi-directional devices, the structure of FIG. 6 remains preferred over the structure of FIG. 7.

Figure 8:
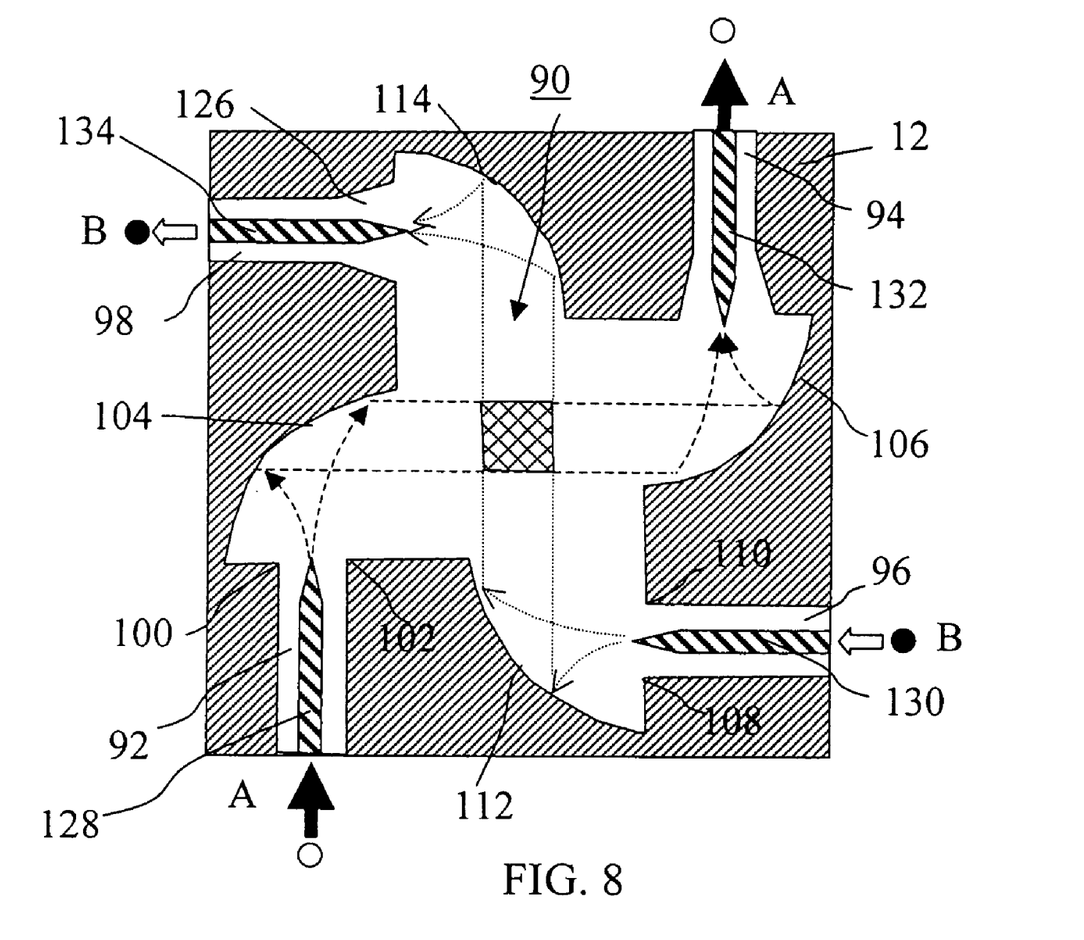
FIG. 8 illustrates a variation of the embodiment of FIG. 6 including polysilicon segments disposed over input and output waveguiding regions.

FIG. 8 is yet another variation of the pinwheel geometry as discussed above in association with FIGS. 6 and 7. In this variation, polysilicon segments have been included over selected portions of the input and output waveguiding regions of the FIG. 7 structure to further improve the coupling efficiency into and out of crossover pinwheel region 90. In particular, first and second polysilicon segments 128 and 130 have been disposed over input waveguiding sections 92 and 96 to improve the lateral confinement of the propagating input signal and shape the properties of the optical beam entering crossover region 90. As shown, the terminations of both polysilicon segments 128 and 130 are tapered to better control the coupling of the signal from the combination polysilicon/silicon waveguiding structure into SOI layer 14 only. An additional pair of polysilicon segments 132 and 134 are shown in FIG. 8 as disposed over output waveguiding sections 94 and 98, respectively, where polysilicon segments 132 and 134 are used to improve the coupling efficiency into (as well as along) each of the output waveguiding sections. It is to be understood that instead of utilizing polysilicon segments, various other rib-type structures (see FIG. 4, for example) may be used.

Figure 9:
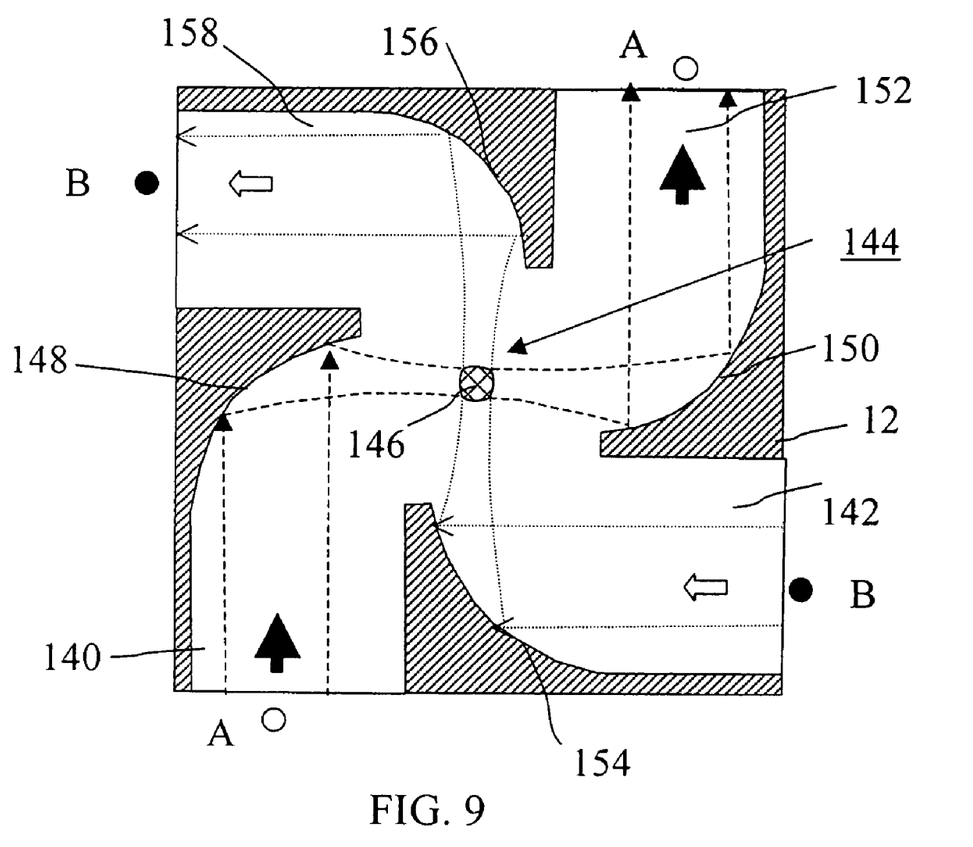
FIG. 9 shows an alternative arrangement of the pinwheel geometry optical crossover region, particularly configured for use with collimated input beams.

A top view of an alternative embodiment of the present invention is illustrated in FIG. 9, where in this case the input signals are collimated prior to entering the crossover structure. In particular, propagating optical signals A and B are shown as being coupled into relatively wide input waveguiding sections 140 and 142, respectively ("relatively wide" as compared to input waveguiding sections 92 and 96 of FIGS. 6-8). As with the embodiment discussed above in association with FIG. 6, the structure as illustrated in FIG. 9 is considered to be a bi-directional device. In this embodiment, an expanded pinwheel crossover region 144 is formed to accommodate the propagating collimated signals and perform a focusing operation on the signals so as to limit the physical extent of the waveguides where the signals will overlap (shaded region 146 illustrating the overlap area). As shown in FIG. 9, collimated optical signal A impinges a first curved sidewall surface 148, where the curve of surface 148 is controlled to transform collimated propagating signal A into a focused beam, as shown. After passing through overlap area 146, propagating optical signal A will begin to expand and propagate through expanded pinwheel crossover region 144 until impinging a second curved sidewall surface 150. The curve of surface 150 is controlled so that the signal is re-converted into a collimated wave as it enters a first output waveguiding region 152.

In a similar fashion, an input collimated optical signal B propagating along input waveguiding section 142 will encounter a third curved sidewall surface 154, which functions to redirect optical signal B and focus the signal toward overlap region 146. As with optical signal A, propagating optical signal B will thereafter expand and then impinge a fourth curved sidewall surface 156, transforming optical signal B into a collimated signal that is directed into a second output waveguiding section 158. As with the embodiments described above, conventional CMOS fabrication techniques may be used process SOI layer 14 to form the desired "expanded pinwheel" geometry for crossover region 144.

Figure 10:
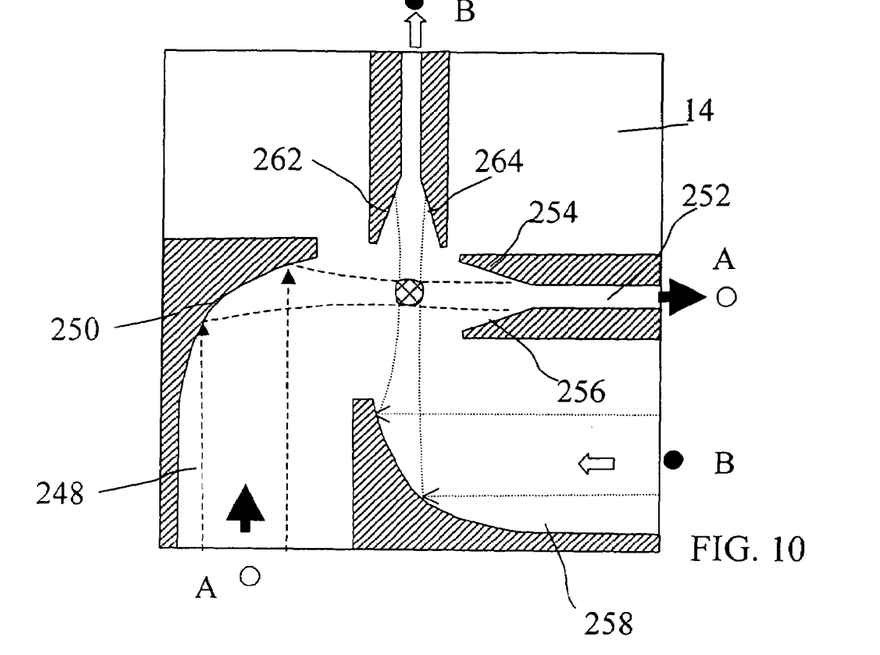
FIG. 10 illustrates a variation of the arrangement of FIG. 9 where the output beams are focused into a sub-micron waveguide subsequent to passing through the optical crossover region.

FIG. 10 illustrates an alternative "pinwheel" geometry crossover region that has been formed to focus an incoming collimated beam into a sub-micron dimensioned waveguide; a desirable arrangement for systems utilizing single mode optical signals. In this arrangement, a collimated optical signal A propagates along input waveguiding segment 248 and encounters a first curved sidewall surface 250, where the curvature of first sidewall 250 has been calculated to provide the desired focusing within the prescribed optical path length. As with the arrangements described above, first curved sidewall surface 250 is formed by patterning and etching SOI layer 14 to exhibit the shape as shown. The portions of SOI layer 14 removed by etching is then subsequently re-planarized using a relatively low index material (such as silicon dioxide or silicon nitride) to maintain the necessary TIR condition.

Referring back to FIG. 10, optical signal A is converted into a focused beam which is thereafter directed into a sub-micron dimensioned waveguide 252, where waveguide 252 is formed to provide sufficient lateral confinement of the optical beam such that only a single mode (fundamental mode) of the propagating optical signal will be supported. As with a number of the embodiments discussed above, beam-capturing sidewalls 254, 256 may be formed at the entrance of waveguide 252 to assist in directing optical signal A into the single mode waveguide. As with various other arrangements described above, polysilicon segments may be disposed over the output waveguiding sections to improve coupling efficiency.

In a similar fashion, incoming optical signal B is illustrated as encountering a second curved sidewall surface 258, where the curvature of surface 258 is calculated to accept an incoming collimated signal and convert the collimated wave into a focused beam. In this case, focused optical signal B is thereafter directed into a single mode waveguide 260, waveguide 260 including beam-capturing sidewalls 262 and 264 to improve its coupling efficiency.

Figure 11:
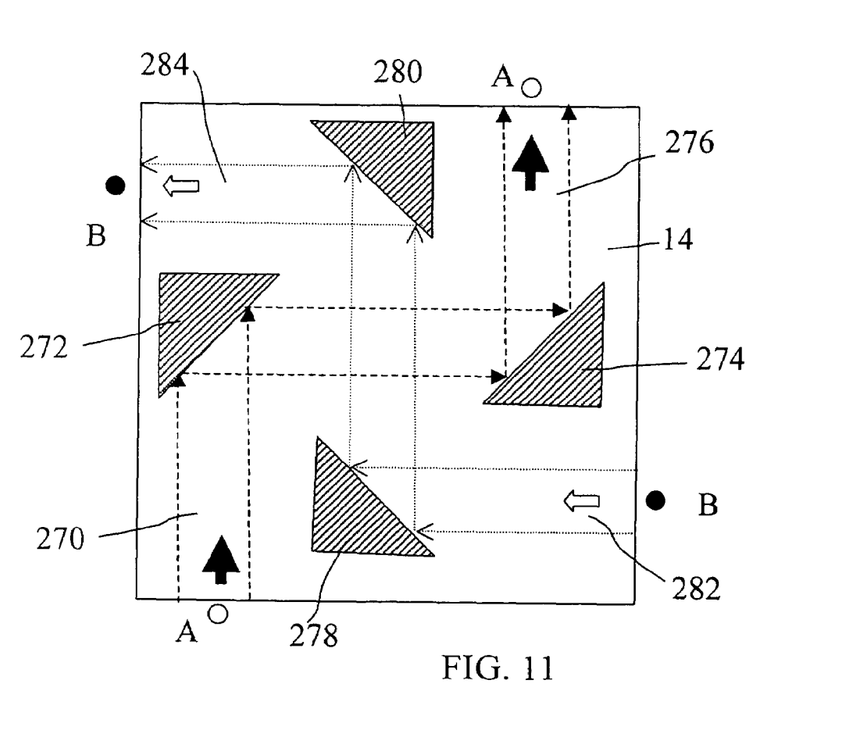
FIG. 11 illustrates an alternative embodiment of the present invention, utilizing a plurality of turning mirrors to form the optical crossover region.

A specific embodiment suitable for providing crossover of collimated signals is illustrated in FIG. 11. In this case, a set of 45° mirror structures may be etched into the surface of SOI layer 14 to provide the desired 90° signal re-direction between the input and the output. As with a number of the arrangements described above, the arrangement of FIG. 11 is a bi-directional optical crossover device, allowing for the "inputs" and "outputs" to be reversed. Referring to FIG. 11, collimated optical signal A will propagate along an input waveguiding area 270 until it impinges a first mirror 272, which is positioned to re-direct optical signal A through a 90° rotation so as to now propagate along a substantially orthogonal signal path until encountering a second mirror 274. Second mirror 274 then again re-directs optical signal A through a 90° rotation, into an output waveguiding area 276. Similarly, third and fourth mirrors 278, 280 are formed at predetermined locations within SOI layer 14 to provide re-direction of collimated optical signal B between an input waveguiding section 282 and output waveguiding section 284 (where as stated above, the "input" and "output" waveguides may be reversed to provide bi-directional transmission).

Figure 12:
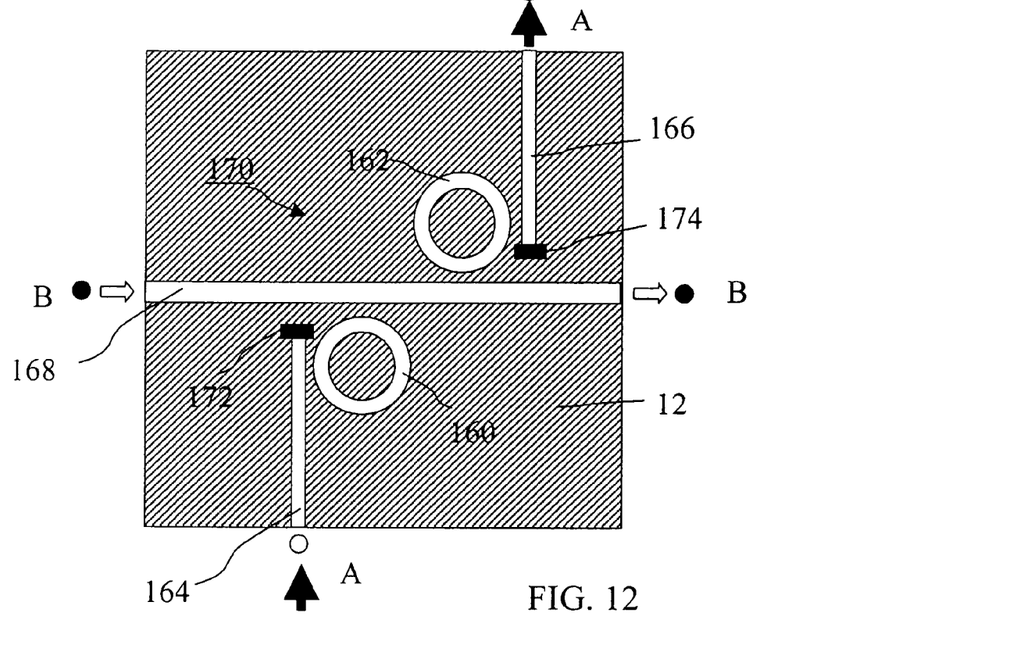
FIG. 12 contains a top view of an exemplary evanescently-coupled optical crossover region formed in accordance with the present invention, utilizing a pair of ring resonators to perform the crossover function.

In contrast to the various embodiments described above, crossover of optical signals may also occur through evanescently coupling a signal from one waveguide to an adjacent waveguide. Evanescent coupling is well-known in the art. FIG. 12 illustrates a first embodiment utilizing evanescent coupling where a pair of ring resonators 160 and 162 is formed by patterning and etching SOI layer 14 of an SOI-based opto-electronic structure. As shown, the etched structures are used to couple propagating optical signal A between an input waveguiding section 164 and output waveguiding section 166. A transverse optical waveguide 168 is used to support the propagation of optical signal B along the signal path as shown in FIG. 12. As with the embodiments discussed above, A and B are preferably orthogonal signals (or signals propagating at substantially different wavelengths). The combination of ring resonators 160, 162 with the central area of transverse optical waveguide 168 is thus defined as a crossover region 170. In operation, optical signal A is coupled into input waveguiding section 164. The presence of first ring resonator 160 will function to evanescently couple at least a portion of the energy in optical signal A into its ring structure. An absorption element 172 is shown as positioned at the termination of input waveguiding section 164. Absorption element 172 may be merely a passive device used to provide containment for any remaining signal not coupled into ring resonator 160. Alternatively, absorption element 172 may comprise an active optical device, used to monitor the functioning of ring resonator by determining the amount of optical energy remaining in waveguide 164, using this information to perhaps "tune" the wavelength sensitivity of ring resonator 160.

As shown in FIG. 12, transverse waveguide 168 is disposed in relation to first ring resonator 160 so as to couple substantially all of the optical energy from first ring resonator 160 into transverse waveguide 168. In this case, second ring resonator 162 is positioned "downstream" of first ring resonator along transverse waveguide 168 so that propagating optical signal A will then couple into second ring resonator 162. By properly positioning output waveguiding section 166 with respect to second ring resonator 162, optical signal A will evanescently couple from second ring resonator 162 into output waveguiding section 166. A second absorption element 174 is included at the termination of output waveguiding section 166, since this particular structure may be used as a bi-directional device (with the inputs and outputs being reversed).

Figure 13:
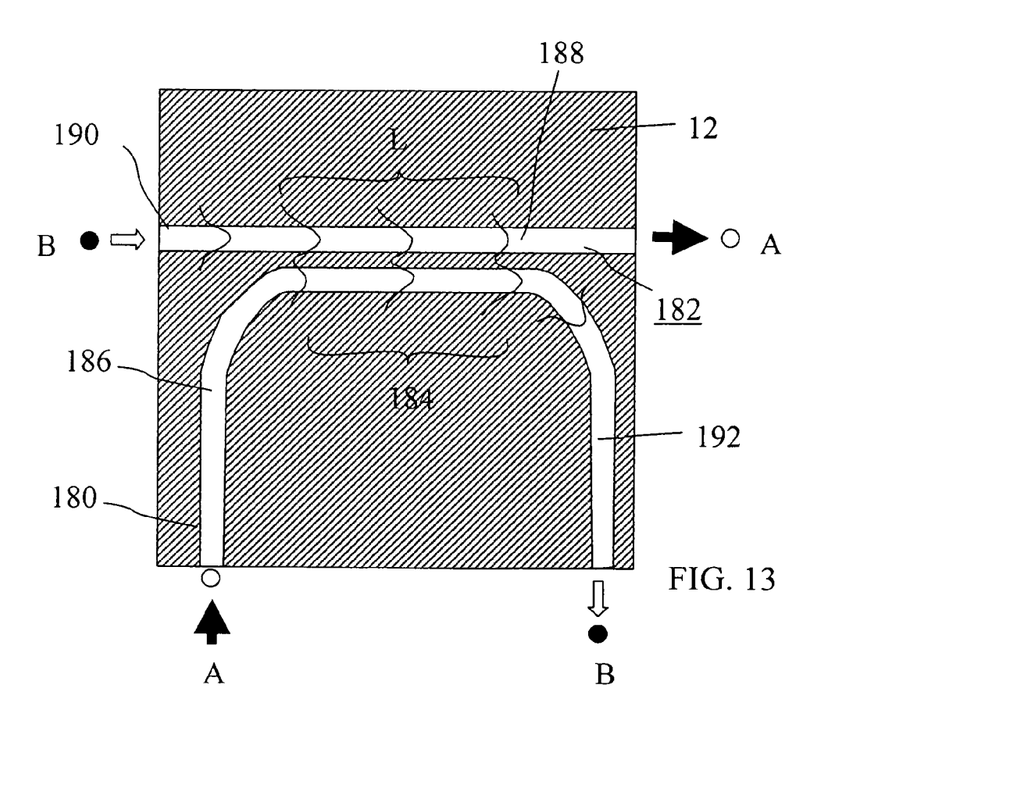
FIG. 13 is a top view of an alternative evanescently-coupled embodiment, in this case utilizing a pair of evanescently coupled waveguides.

FIG. 13 illustrates an alternative evanescent coupling arrangement of the present invention, again forming the waveguiding sections and crossover region by patterning and etching SOI layer 14 of an SOI-based structure. In the embodiment of FIG. 13, a pair of waveguides 180 and 182 is formed as shown within SOI layer 14. Waveguide 182 is illustrated as a transverse waveguide structure and waveguide 180 is illustrated as a "U"-shaped waveguide, with the base of the "U" formed to be essentially parallel with a portion of waveguide 182 and form an evanescent coupling ("crossover") region 184. The length L of crossover region 184 is determined as a function of the wavelength of the propagating (orthogonal) signals so that input propagating optical signal A will be coupled from an input waveguiding section 186 of U-shaped waveguide 180 into an output waveguiding section 188 of transverse waveguide 182, with optical signal B thus be coupled from an input waveguiding section 190 of transverse waveguide 182 into an output waveguiding section 192 of U-shaped waveguide 180.

Figure 14:
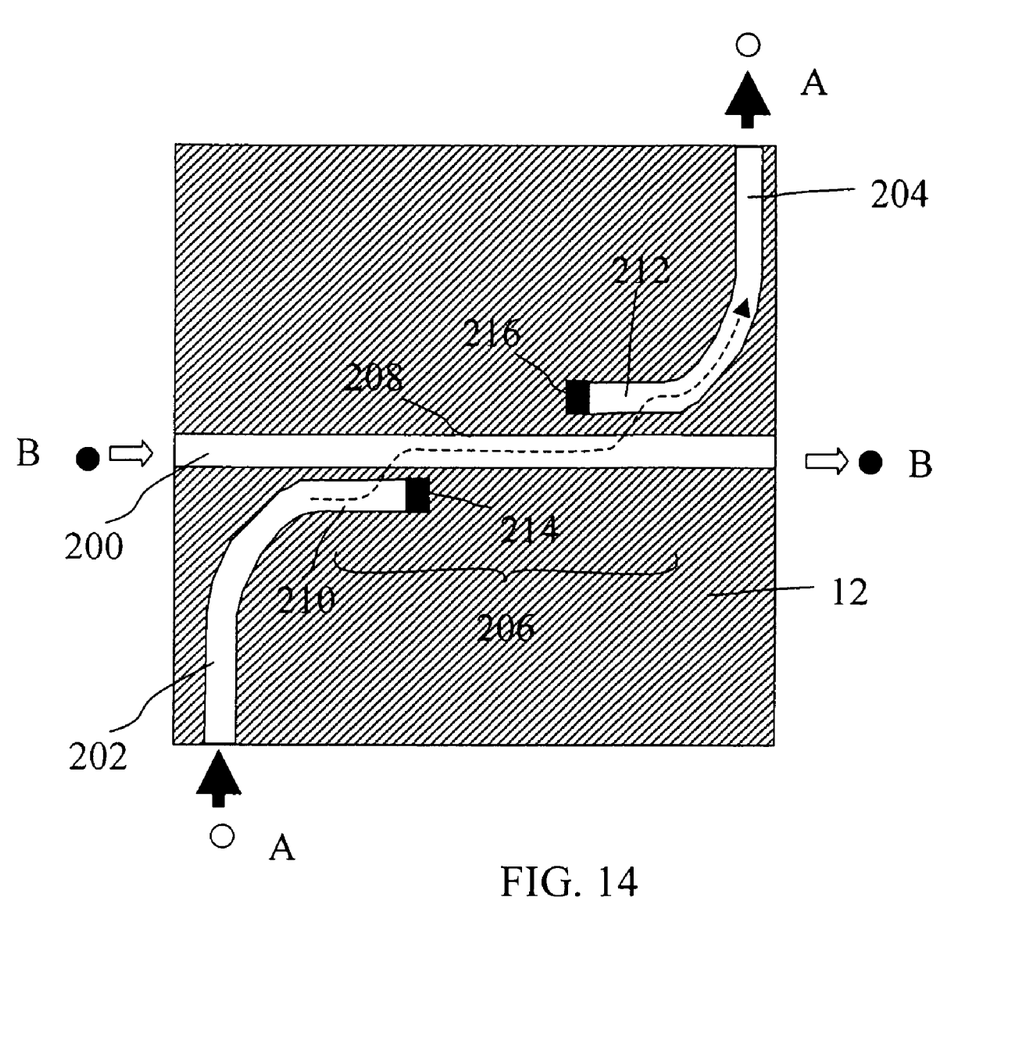
FIG. 14 contains a top view of an optical tap crossover configuration formed in accordance with the present invention.

An optical tap type of crossover formed in accordance with the present invention is shown in FIG. 14, which includes a transverse waveguide 200 and a pair of optical tap waveguides 202, 204 formed by patterning and etching SOI layer 14 of an SOI-based structure. As shown, propagating optical signal A is applied as an input along first optical tap waveguide 202, and is then evanescently coupled into transverse waveguide 200. Optical signal B is shown as propagating in the transverse direction along the full extent of waveguide 200, where relatively little (if any) of the energy from optical signal B is coupled into either one of optical taps 202 and 204. A crossover region 206 is defined in this embodiment as comprising the central portion 208 of transverse waveguide 200 where both optical signals A and B are supported, as well as the end portions 210 and 212 of optical taps 202 and 204, respectively. As with the embodiment of FIG. 12, a pair of absorption elements 214 and 216 may be disposed at the terminations of end portions 210 and 212, respectively, to absorb any remaining signal and, possibly, function as a detecting element. Indeed, the arrangement of FIG. 14 is also bi-directional, where the input and output waveguides may be reversed so as to support the propagation of optical signals in the opposite direction.

Although the present invention has been shown and described with respect to several preferred embodiments, it is to be understood that various changes, modifications, additions, etc. may be made in the form and detail thereof without departing from the spirit and scope of the invention as defined by claims appended hereto:

What is claimed is:

1. A silicon-on-insulator (SOI)-based optical device including a surface silicon waveguiding layer disposed over an insulating layer covering a silicon substrate, the SOI-based optical device comprising:

a first optical input waveguide for supporting the propagation of a first optical signal;

a second optical input waveguide for supporting the propagation of a second optical signal;

a first optical output waveguide for supporting the propagation of the first optical signal;

a second optical output waveguide for supporting the propagation of the second optical signal;

an optical crossover region defined by an intersection of the first optical input waveguide with the second optical input waveguide, the optical crossover region comprising a first pair of curved reflecting sidewall surfaces (104, 106) disposed to intercept the first optical signal propagating along the first input optical waveguide, an input curved sidewall surface of the first pair of curved reflecting sidewall surfaces for providing a first redirection of the first optical signal into the optical crossover region, and an output curved sidewall surface of the first pair of curved reflecting sidewall surfaces for providing a second redirection of the first optical signal out of the optical crossover region and into the first optical output waveguide; and a second pair of curved reflecting sidewall surfaces (112, 114) disposed to intercept the second optical signal propagating along the second input optical waveguide, an input curved sidewall surface of the second pair of curved reflecting sidewall surfaces for providing a first redirection of the second optical signal into the optical crossover region and an output curved sidewall surface of the second pair of curved reflecting sidewall surfaces for providing a second redirection of the second optical signal out of the optical crossover region and into the second optical output waveguide.

2. An SOI-based optical device as defined in claim 1 wherein the input curved sidewall surfaces of the first and second pair of curved reflecting sidewall surfaces are curved so as to transform an expanding input signal into a collimated redirected signal.

3. An SOI-based optical device as defined in claim 1 wherein the output curved sidewall surfaces of the first and second pair of curved reflecting sidewall surfaces are curved to transform a collimated input signal into an expanding redirected signal.

4. An SOI-based optical device as defined in claim 1 wherein each of the curved reflecting sidewall surfaces is formed as a 45° reflecting mirror surface.

5. An SOI-based optical device as defined in claim 1 wherein the input curved sidewall surfaces of the first and second pair of curved reflecting sidewall surfaces are curved to transform a collimating input signal into a focusing redirected signal.

6. An SOI-based optical device as defined in claim 1 wherein the output curved sidewall surfaces of the first and second pair of curved reflecting sidewall surfaces are curved to transform an expanding input signal into a collimated redirected signal.

7. An SOI-based optical device as defined in claim 1 wherein the first and second optical output waveguides are formed to include inwardly tapering portions therealong.

8. An SOI-based optical device as defined in claim 1 wherein the device further comprises a plurality of separate rib waveguide segments disposed over the first and second optical input waveguides and the first and second optical output waveguides.

9. An SOI-based optical device as defined in claim 8 wherein the rib segments comprise polysilicon segments.

10. An SOI-based optical device as defined in claim 8 wherein the plurality of separate rib segments include tapered end terminations adjacent to the optical crossover region.

* * * * *